United States Patent Office.

JOEL BRENTON, OF PITTSTON, PENNSYLVANIA, ASSIGNOR TO HIMSELF, FREDERICK C. EPTING, ALPHEUS CATLER, JAMES L. GIDDINGS, AND RICHARD BRENTON, OF SAME PLACE.

Letters Patent No. 95,977, dated October 19, 1869.

IMPROVED PAINT AND PIGMENT.

The Schedule referred to in these Letters Patent and making part of the same.

*To all whom it may concern:*

Be it known that I, JOEL BRENTON, of Pittston, in the county of Luzerne, and in the State of Pennsylvania, have invented a certain new and useful Black Paint, made out of a newly-discovered black mineral; and I do hereby declare that the following is a full, clear, and exact description thereof.

The nature of my invention consists in making a material which is prepared and packed dry, and to be put on the market as a material out of which to make black paint; also, in the formation of a black paint already prepared, from a newly-discovered mineral substance known as "black mineral," found in Schuylkill county, Pennsylvania, hitherto unknown for any such purposes.

To enable others skilled in the art to make and use my invention, I will proceed to describe its construction and operation.

In the process of constructing my material for black paint, the mineral is dug up from its bed and dried by the sun and air, or by artificial means, any of which I may use; it is then ground in a mill, so as to thoroughly reduce the same to a fine powder, without any lumps, so as to make it an impalpable powder. In this condition it is put up in packages, kegs, or barrels, and put on the market as a material for making black paint, and to be used instead of "lamp-black," and which can be readily mixed into paint by all painters, in any of the ways known to painters for such purposes. In this form, I readily supply the trade with a cheap and elegant material out of which to form a good and substantial black paint.

The material is taken from the mine, and dried by any suitable process, and is then ground, as paints are usually ground, in mills, or between stones, and in this form is put up in cans, or otherwise, for use, and thus put on the market. If found necessary, it can be thinned, in any ordinary way known to painters, in applying it.

In this form, it makes a common black paint, and furnishes a fine body in covering the article painted, and is durable, looks well, and forms a cheap paint for all purposes where a cheap paint is required.

The material passing through a more extended process than before described, may be formed into a much finer black paint than that above described, and is to be used in painting carriages and other fine articles that are to be painted black.

The material, after being dried and powdered, is then mixed with from five to ten per cent. of the prussiate of iron, and then ground again in water, between stones, or otherwise, so as to thoroughly mix the two articles together, after which it is caused to form in drops, in the usual manner of forming drop paints; and in this form it is to be put on the market, as black-paint drops. And when it is required for use as paint, it is ground in spirits of turpentine, oil, or any other liquid that paints are usually ground in. It then can be thinned for use, as required, and is then ready for use, and can be applied in the manner all other paints are applied.

The number of coats put on, and the style of finish will be according to taste, and the article to be painted.

I have found, by tests, that my black paint is of equal capacity to any other black paint now in use, and is equally durable, resists the air and weather, and retains its appearance equal to any other black paint now in use.

I have fully tested this as a new material for making black paint, and find it an equal substitute for lamp-black, and is much cheaper, and can be safely used as a black paint for all purposes for which lamp-black is now used, whether in or out of doors. I find it valuable in the manufacture of some other colored paints, for tinting, either in the dry or mixed state in which such articles are put on the market.

Having thus fully described the nature of my discovery and my invention,

What I claim as new, and desire to secure by Letters Patent, is—

1. The manner, herein described, of preparing a material to be used in making black paint out of the above-described black mineral, substantially as set forth.

2. The manner, herein described, of making a black paint out of a newly-discovered "black mineral," substantially as set forth and for the purposes specified.

3. A black paint or pigment, made of the mineral herein described, as set forth.

In testimony that I claim the above-described invention, I have hereunto signed my name, this 23d day of August, 1869.

JOEL BRENTON.

Witnesses:
JOHN ANDERSON,
JOHN J. KELCHNER.